United States Patent
Sullivan et al.

(10) Patent No.: US 9,847,919 B2
(45) Date of Patent: Dec. 19, 2017

(54) DATA NETWORK DEVICE DISCOVERY OPTIMIZATION TO REDUCE DATA TRANSFER VOLUME

(71) Applicant: Ericsson Inc., Plano, TX (US)

(72) Inventors: William Sullivan, North Grafton, MA (US); Francis Xavier Reichmeyer, Madison, CT (US); David Campbell Taylor, Holliston, MA (US); Albert Lamar Phillips, Fitchburg, MA (US)

(73) Assignee: ERICSSON INC., Plano, TX (US)

( * ) Notice: Subject to any disclaimer, the term of this patent is extended or adjusted under 35 U.S.C. 154(b) by 474 days.

(21) Appl. No.: 14/396,699

(22) PCT Filed: Mar. 29, 2013

(86) PCT No.: PCT/US2013/034627
§ 371 (c)(1),
(2) Date: Oct. 23, 2014

(87) PCT Pub. No.: WO2013/149158
PCT Pub. Date: Oct. 3, 2013

(65) Prior Publication Data
US 2015/0081886 A1    Mar. 19, 2015

Related U.S. Application Data

(60) Provisional application No. 61/618,178, filed on Mar. 30, 2012.

(51) Int. Cl.
*H04L 12/26* (2006.01)
*H04L 12/24* (2006.01)
*H04L 29/08* (2006.01)

(52) U.S. Cl.
CPC .......... *H04L 43/04* (2013.01); *H04L 41/0823* (2013.01); *H04L 67/16* (2013.01)

(58) Field of Classification Search
CPC ...... H04L 41/0823; H04L 43/04; H04L 67/16
See application file for complete search history.

(56) References Cited

U.S. PATENT DOCUMENTS 5,922,051 A    7/1999    Sidey
6,791,998 B1    9/2004    Yoshihara et al.
(Continued)

FOREIGN PATENT DOCUMENTS

EP    1 244 248 A1    9/2002

OTHER PUBLICATIONS

International Search Report dated Jul. 12, 2013 corresponding to International Patent Application No. PCT/US2013/034627; 3 pages.
(Continued)

*Primary Examiner* — Azizul Choudhury (57) ABSTRACT

There is provided a method of reducing traffic on a data network. The method includes (i) reading an indicator of whether a last attempted communication with a network device was successful, and (ii) performing discovery of the network device at each time specified by a first schedule in response to the indicator indicating that the last attempted communication with the network device was successful, and at each time specified by a second schedule in response to the indicator indicating that the last attempted communication with the network device was not successful. There is also provided a system that performs the method, and a storage device that contains a program that controls a processor to perform the method.

12 Claims, 5 Drawing Sheets

(56) References Cited

U.S. PATENT DOCUMENTS

| | | | |
|---|---|---|---|
| 7,912,950 B1 | 3/2011 | Saparoff | |
| 8,280,999 B2 | 10/2012 | Liao et al. | |
| 8,379,571 B2 | 2/2013 | Smires et al. | |
| 8,571,481 B2 | 10/2013 | Julka et al. | |
| 2003/0200285 A1* | 10/2003 | Hansen | H04L 41/0806 709/220 |
| 2005/0083854 A1* | 4/2005 | Nagarajrao | H04L 12/24 370/254 |
| 2007/0220608 A1 | 9/2007 | Lahti et al. | |
| 2008/0198036 A1 | 8/2008 | Songkakul et al. | |
| 2009/0196285 A1* | 8/2009 | Smires | H04W 8/245 370/352 |
| 2009/0240353 A1* | 9/2009 | Songkakul | H04Q 9/00 700/90 |
| 2011/0225283 A1* | 9/2011 | Liao | G06F 9/4416 709/223 |
| 2013/0038897 A1* | 2/2013 | Heckler | H04L 67/16 358/1.15 |

OTHER PUBLICATIONS

Written Opinion dated Jul. 12, 2013 corresponding to International Patent Application No. PCT/US2013/034627; 9 pages.

\* cited by examiner

DATA NETWORK DEVICE DISCOVERY OPTIMIZATION TO REDUCE DATA TRANSFER VOLUME

CLAIM OF PRIORITY

This application is a 371 of International Application No. PCT/US2013/34627 filed Mar. 29, 2013, which claims the benefit of U.S. Provisional Application Ser. No. 61/618,178, filed Mar. 30, 2012. The disclosures of these documents are hereby incorporated herein by reference.

BACKGROUND OF THE DISCLOSURE

1. Field of the Disclosure

The present disclosure relates to a data network, and more particularly, to a data network in which a network management system (NMS) collects values of attributes from devices in the network during discovery of the devices.

2. Description of the Related Art

The approaches described in this section are approaches that could be pursued, but not necessarily approaches that have been previously conceived or pursued. Therefore, the approaches described in this section may not be prior art to the claims in this application and are not admitted to be prior art by inclusion in this section.

A network, i.e., a data network, includes a network management system (NMS) and a plurality of devices that are communicatively coupled to the network. The NMS collects values of attributes from devices during discovery of the devices. Discovery is one of a plurality of communications that may occur between the NMS and the devices. The NMS sends discovery requests to the devices, the devices respond with the values of attributes, and the NMS uses the responses to update values of database entries that correspond to the attributes. A volume of data transferred on the network as a result of discovery is a function of a number of devices from which values are collected, a number of values that are collected from each device, and a frequency of discovery operations. If the network is a cellular communications network, where cost is a function of the volume of data transferred, then it is desirable to reduce that volume. However, it is undesirable to reduce the update frequency for the corresponding database entries. There is therefore a need for an NMS that reduces data transfer volume without affecting the desired update frequency for database entries.

SUMMARY OF THE DISCLOSURE

There is provided a method of reducing traffic on a data network. The method includes (i) reading an indicator of whether a last attempted communication with a network device was successful, and (ii) performing discovery of the network device at each time specified by a first schedule in response to the indicator indicating that the last attempted communication with the network device was successful, and at each time specified by a second schedule in response to the indicator indicating that the last attempted communication with the network device was not successful. There is also provided a system that performs the method, and a storage device that contains a program that controls a processor to perform the method.

BRIEF DESCRIPTION OF DRAWINGS

A component or a feature that is common to more than one drawing is indicated with the same reference number in each of the drawings.

DESCRIPTION OF THE DISCLOSURE

The present disclosure includes methods and data structures for an NMS that optimize discovery by reducing the frequency for sending discovery requests, and reducing the number of values of attributes requested, without affecting the desired update frequency for the corresponding database entries. One such data structure is a profile, which includes a schedule and a set of conditions for a network device. A schedule specifies how often the NMS initiates discovery for a device. Examples of schedules include "every hour" and "every Sunday at noon". Each condition specifies whether a particular attribute should be included in a discovery request. Examples of conditions include "every discovery" and "device reboot". At each scheduled interval specified by a profile, the NMS will evaluate each condition in the profile to determine which attribute values will be requested from a device to which the profile applies.

An NMS considers a network device to be reachable if the device responded to the most recent request from the NMS or has sent a message to the NMS since that request; otherwise, the NMS considers the device to be unreachable. Each device is associated with one profile that applies when the device is considered reachable and another profile that applies when the device is considered unreachable. Each profile can apply to multiple devices.

A profile that has a more frequent schedule can be applied to a network device that is more important or that has attributes that change values more often. Similarly, a condition that is more likely to occur can be associated with an attribute that is more important or that changes value more often. Also, an unreachable profile can include more conditions that are more likely to occur than those included by a reachable profile, so that more information will be gathered from a device that has been offline.

A user can thus optimize the frequency and size of discovery requests by configuring schedules to cause the NMS to apply some profiles more frequently than others and by configuring conditions to cause the NMS to be more likely to request some attributes than others. This optimization will reduce the data transfer volume of discovery requests and responses without affecting the desired update frequency for the corresponding database entries.

Figure 1:
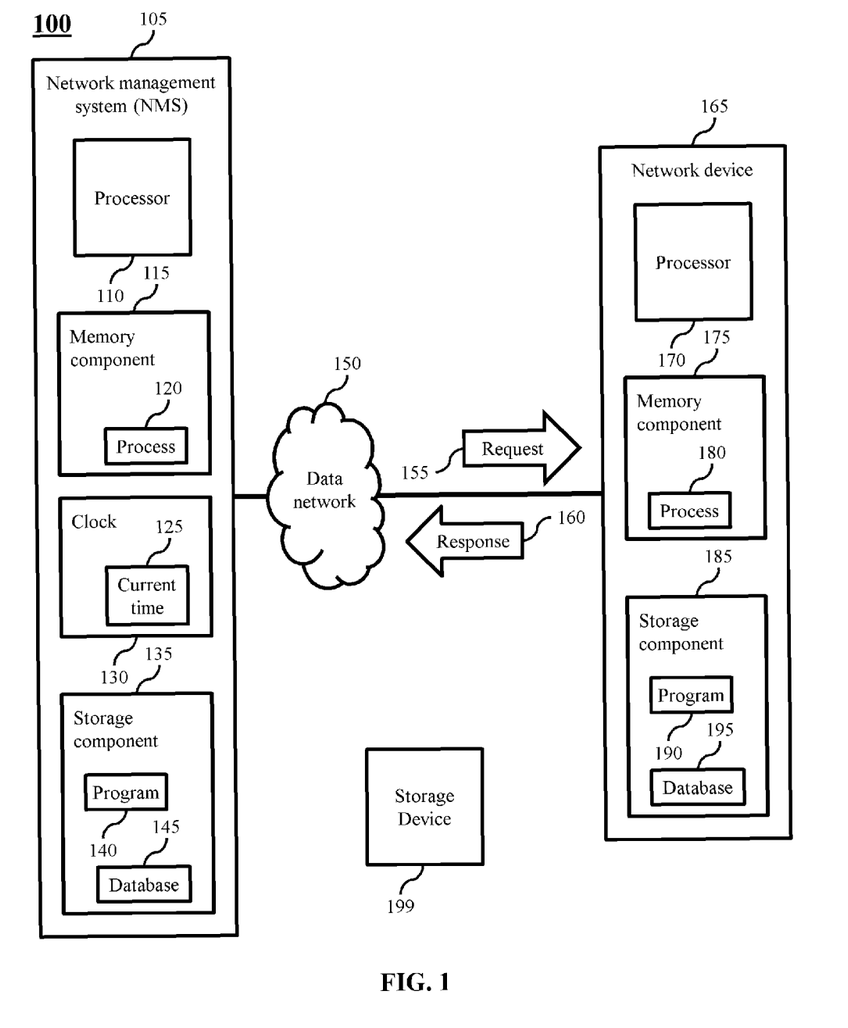
FIG. 1 is a block diagram of a discovery system, comprising a network management system (NMS), a data network, and a network device.

FIG. 1 is a block diagram of a discovery system, i.e., system 100, comprising a network management system (NMS) 105, a data network 150, and a network device 165. NMS 105 performs network discovery by communicating with network device 165 over data network 150, including sending a request 155 to network device 165 and receiving a response 160 from network device 165.

NMS 105 is a computing device that comprises a processor 110, a memory component 115, a clock 130, and a storage component 135.

Processor 110 is an electronic device configured of logic circuitry that responds to and executes instructions.

Clock 130 is an electronic device that maintains a current time 125.

Storage component 135 is a tangible computer-readable storage medium encoded with a computer program. In this regard, storage component 135 stores data and instructions, i.e., program code, that are readable and executable by processor 110 for controlling the operation of processor 110. Storage component 135 may be implemented in a random access memory (RAM), a hard drive, a read only memory (ROM), or a combination thereof. One of the components of storage component 135 is a program 140.

Processor 110 reads program 140 from storage component 135 and executes it as a process 120 in memory component 115. Processor 110 reads from and writes to a database 145 in storage component 135. Processor 110 gets current time 125 from clock 130.

Network device 165 is a computing device that comprises a processor 170, a memory component 175, and a storage component 185.

Processor 170 is an electronic device configured of logic circuitry that responds to and executes instructions.

Storage component 185 is a tangible computer-readable storage medium encoded with a computer program. In this regard, storage component 185 stores data and instructions, i.e., program code, that are readable and executable by processor 170 for controlling the operation of processor 170. Storage component 185 may be implemented in a random access memory (RAM), a hard drive, a read only memory (ROM), or a combination thereof. One of the components of storage component 185 is a program 190.

Processor 170 reads a program 190 from storage component 185 and executes it as a process 180 in memory component 175. Processor 170 reads from and writes to a database 195 in storage component 185.

While program 140 is indicated as already loaded into storage component 135, it may be configured on a storage device 199 for subsequent loading into storage component 135. Storage device 199 is a tangible computer-readable storage medium that program 140 thereon. Examples of storage device 199 include a compact disk, a magnetic tape, a read only memory, an optical storage media, a hard drive or a memory unit consisting of multiple parallel hard drives, and a universal serial bus (USB) flash drive. Alternatively, storage device 199 can be a random access memory, or other type of electronic storage device, located on a remote storage system and coupled to NMS 105 via network 150. Program 190 may similarly be configured on storage device 199 for subsequent loading into storage component 185.

Figure 2:
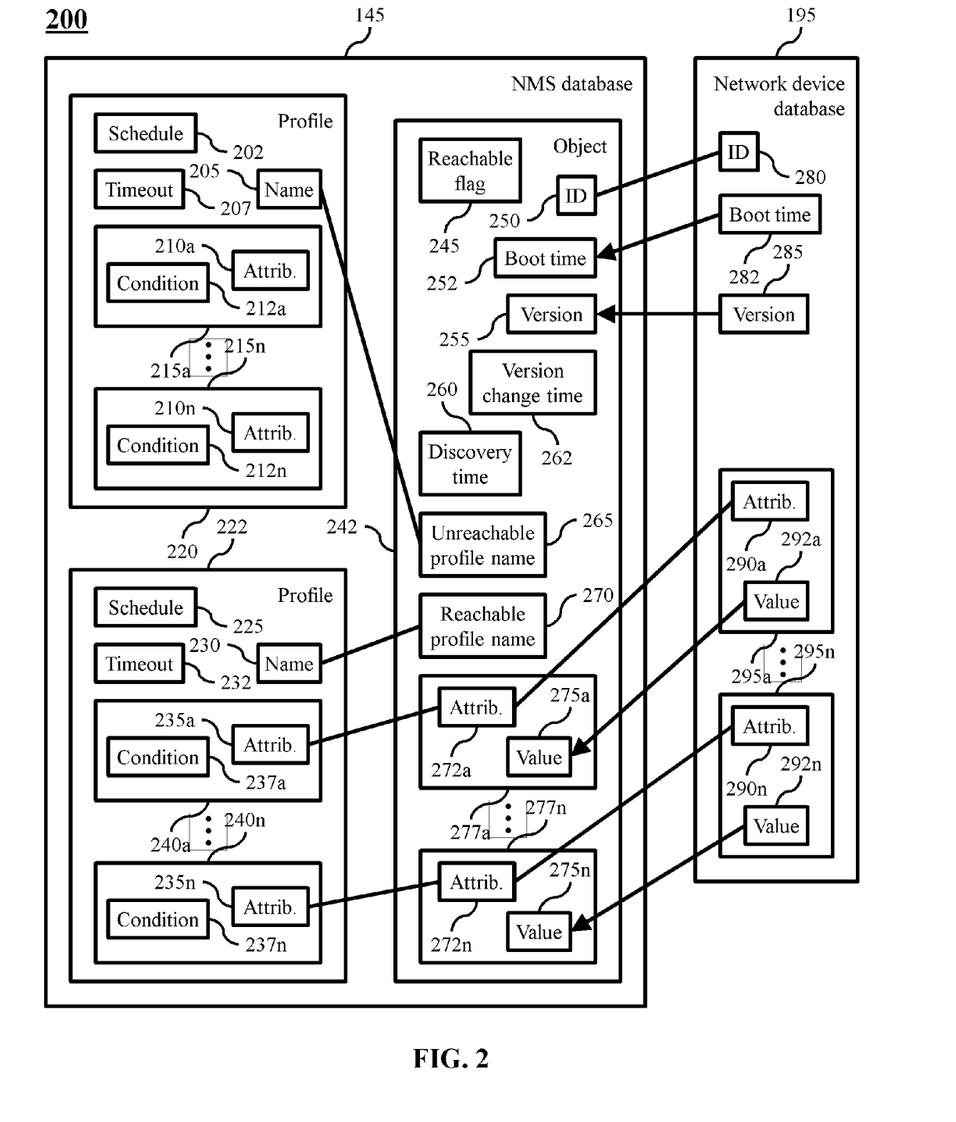
FIG. 2 is a block diagram of data structures maintained by an NMS, data structures maintained by a network device, and relationships among those data structures.

FIG. 2 is a block diagram of data structures maintained by NMS 105 in database 145, data structures maintained by network device 165 in database 195, and relationships among those data structures. Database 145 comprises a profile 220, a profile 222, and an object 242. Profile 220 comprises a schedule 202, a name 205, a timeout 207, and an attribute-condition (AC) pair 215a through an AC pair 215n. Each of AC pair 215a through AC pair 215n comprises an attribute 210a and a condition 212a through an attribute 210n and a condition 212n, respectively. Profile 222 comprises a schedule 225, a name 230, a timeout 232, and an AC pair 240a through an AC pair 240n. Each of AC pair 240a through AC pair 240n comprises an attribute 235a and a condition 237a through an attribute 235n and a condition 237n, respectively.

Each of profile 220 and profile 222 is a description of how NMS 105 performs discovery on network device 165. Each of schedule 202 and schedule 225 is a description of a recurring sequence of times at which NMS 105 will perform discovery on network device 165. Sample values for each of schedule 202 and schedule 225 include "every Monday at noon" and "hourly". Each of name 205 and name 230 is an identifier for profile 220 and profile 222, respectively. Each of timeout 207 and timeout 232 indicates an amount of time, e.g., a number of seconds, for NMS 105 to wait after sending request 155 to network device 165 for response 160 to arrive, before NMS 105 deems network device 165 as unreachable.

Each of attribute 210a through attribute 210n and attribute 235a through attribute 235n is a descriptor of a discoverable feature of network device 165. Sample values for each of attribute 210a through attribute 210n include "model number" and "software version number". Attribute 235a through attribute 235n are directed to the same features of network device 165 as attribute 210a through attribute 210n. Each of condition 212a through condition 212n is a constraint on when NMS 105 should perform discovery for attribute 210a through attribute 210n, respectively. Each of condition 237a through condition 237n is a constraint on when NMS 105 should perform discovery for attribute 235a through attribute 235n, respectively. Sample values for each of condition 212a through condition 212n and condition 237a through condition 237n include "every discovery", "initial discovery", "version change", and "device reboot".

Database 195 comprises an ID 280, a boot time 282, a version 285, and an attribute-value (AV) pair 295a through an AV pair 295n. Each of AV pair 295a through AV pair 295n comprises an attribute 290a and a value 292a through an attribute 290n and a value 292n, respectively.

Boot time 282 indicates a time at which network device 165 last rebooted. Version 285 is an identifier of a current version, e.g., a software version, of network device 165. Each of value 292a through value 292n is a value for attribute 290a through attribute 290n, respectively.

Object 242 comprises an ID 250, a reachable flag 245, a boot time 252, a version 255, a version change time 262, a discovery time 260, an unreachable profile name 265, a reachable profile name 270, and an AV pair 277a through an AV pair 277n. Each of AV pair 277a through AV pair 277n comprises an attribute 272a and a value 275a through an attribute 272n and a value 275n, respectively.

Object 242 contains information about network device 165. ID 250 is an identifier of network device 165 and is equal to ID 280. Reachable flag 245 is a flag, i.e., an indicator, that indicates whether a last attempted communication between NMS 105 and network device 165 was successful. Reachable flag 245, when TRUE, indicates that a last attempted communication between NMS 105 and network device 165 was successful. Reachable flag 245, when FALSE, indicates that a last attempted communication between NMS 105 and network device 165 was not successful. Each of boot time 252 and version 255 is updated with boot time 282 and version 285, respectively, when NMS 105 performs discovery on network device 165. Version change time 262 indicates a time at which version 255 was last changed.

Discovery time 260 indicates a time at which NMS 105 most recently performed discovery of network device 165. Sample values for discovery time 260 include any valid time, i.e., date and time, and "never", which signifies that discovery of network device 165 has not yet occurred. Unreachable profile name 265 is an identifier of a profile used by NMS 105 to perform discovery on network device 165 when reachable flag 245 is FALSE. In this example, unreachable profile name 265 is equal to name 205, as indicated by a line from unreachable profile name 265 to name 205. Reachable profile name 270 is an identifier of a profile used by NMS 105 to perform discovery on network device 165 when reachable flag 245 is TRUE. In this example, reachable profile name 270 is equal to name 230, as indicated by a line from reachable profile name 270 to name 230. Attribute 272a through attribute 272n are directed to the same features of network device 165 as attribute 235a through attribute 235n. Each of value 275a through value 275n is updated with value 292a through value 292n, respectively, when NMS 105 performs discovery on network device 165.

Figure 3:
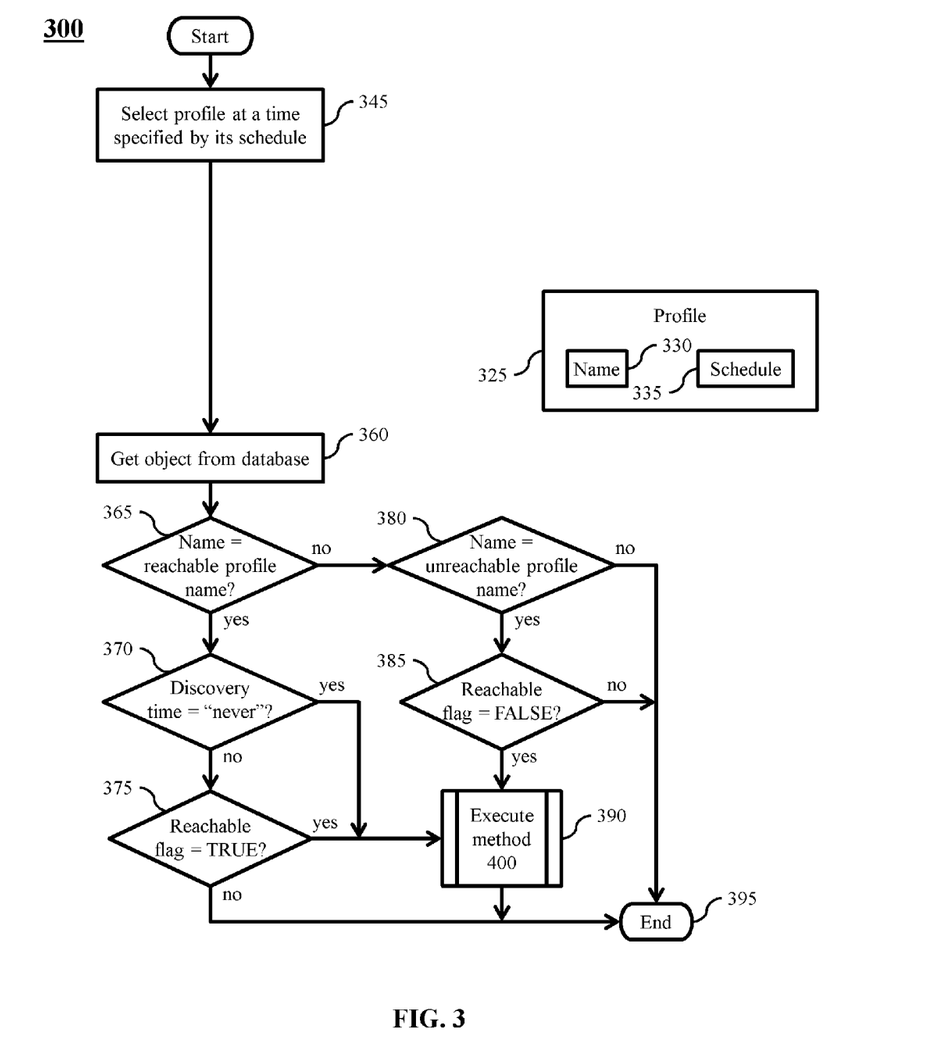
FIG. 3 is a flowchart of a method executed by an NMS to remove a profile from a queue and to determine whether to perform discovery on a network device using the profile.

FIG. 3 is a flowchart of a method 300 executed by NMS 105, in particular by processor 110, to determine whether to perform discovery on network device 165. Method 300 begins with step 345.

In step 345, processor 110 is notified by a scheduler (not shown) at a time specified by schedule 202 that profile 220 should be evaluated, and similarly, at a time specified by schedule 225 that profile 222 should be evaluated. Processor 110 instantiates a profile 325, which includes a name 330 and a schedule 335. Profile 325 is a pointer to, and is therefore equivalent to, one of profile 220 or profile 222. Accordingly, name 330 is equivalent to one of name 205 or name 230, and schedule 335 is equivalent to one of schedule 202 or schedule 225. From step 345, method 300 proceeds to step 360.

In step 360, processor 110 gets object 242 from database 145. From step 360, method 300 proceeds to step 365.

In step 365, processor 110 determines whether profile 325 is the reachable profile for network device 165. If name 330 is equal to reachable profile name 270, thus identifying profile 222 for processing, then method 300 proceeds to step 370; otherwise, method 300 proceeds to step 380.

In step 370, knowing from step 365 that profile 325 is the reachable profile for network device 165, processor 110 determines whether NMS 105 has ever successfully performed discovery of network device 165, because a first discovery of network device 165 should be performed using a reachable profile. Accordingly, if discovery time 260 is equal to "never", thus indicating that NMS 105 has never successfully performed discovery of network device 165, then method 300 proceeds to step 390; otherwise, method 300 proceeds to step 375.

In step 375, knowing from step 365 that profile 325 is the reachable profile for network device 165, and knowing from step 370 that NMS 105 has previously successfully performed discovery of network device 165, processor 110 reads reachable flag 245 to determine whether a last attempted communication between NMS 105 and network device 165 was successful. This is done because when a discovery of network device 165 is not a first discovery of network device 165, and a last attempted communication between NMS 105 and network device 165 was successful, discovery of network device 165 should be performed using a reachable profile. At this point, if reachable flag 245 is FALSE, then NMS 105 will not perform discovery on network device 165 at this time. Accordingly, if reachable flag 245 is TRUE, thus indicating that a last attempted communication between NMS 105 and network device 165 was successful, then method 300 proceeds to step 390; otherwise, method 300 proceeds to step 395.

In step 380, processor 110 determines whether profile 325 is the unreachable profile for network device 165. At this point, if name 330 is not equal to unreachable profile name 265, then NMS 105 will not perform discovery on network device 165 at this time. Accordingly, if name 330 is equal to unreachable profile name 265, thus identifying profile 220 for processing, then method 300 proceeds to step 385; otherwise, method 300 proceeds to step 395.

In step 385, knowing from step 380 that profile 325 is the unreachable profile for network device 165, processor 110 reads reachable flag 245 to determine whether a last attempted communication between NMS 105 and network device 165 was not successful. This is done because when a last attempted communication between NMS 105 and network device 165 was unsuccessful, discovery of network device 165 should be performed using an unreachable profile. At this point, if reachable flag 245 is TRUE, then NMS 105 will not perform discovery on network device 165 at this time. Accordingly, if reachable flag 245 is FALSE, thus indicating that a last attempted communication between NMS 105 and network device 165 was not successful, then method 300 proceeds to step 390; otherwise, method 300 proceeds to step 395.

In step 390, processor 110 executes a method 400 in order to prepare for discovery on network device 165 using profile 325. From step 390, method 300 proceeds to step 395.

In step 395, method 300 ends. However, in practice, method 300 will run in a continuous loop, and as such, from step 395, method 300 will loop back to step 345.

Figure 4:
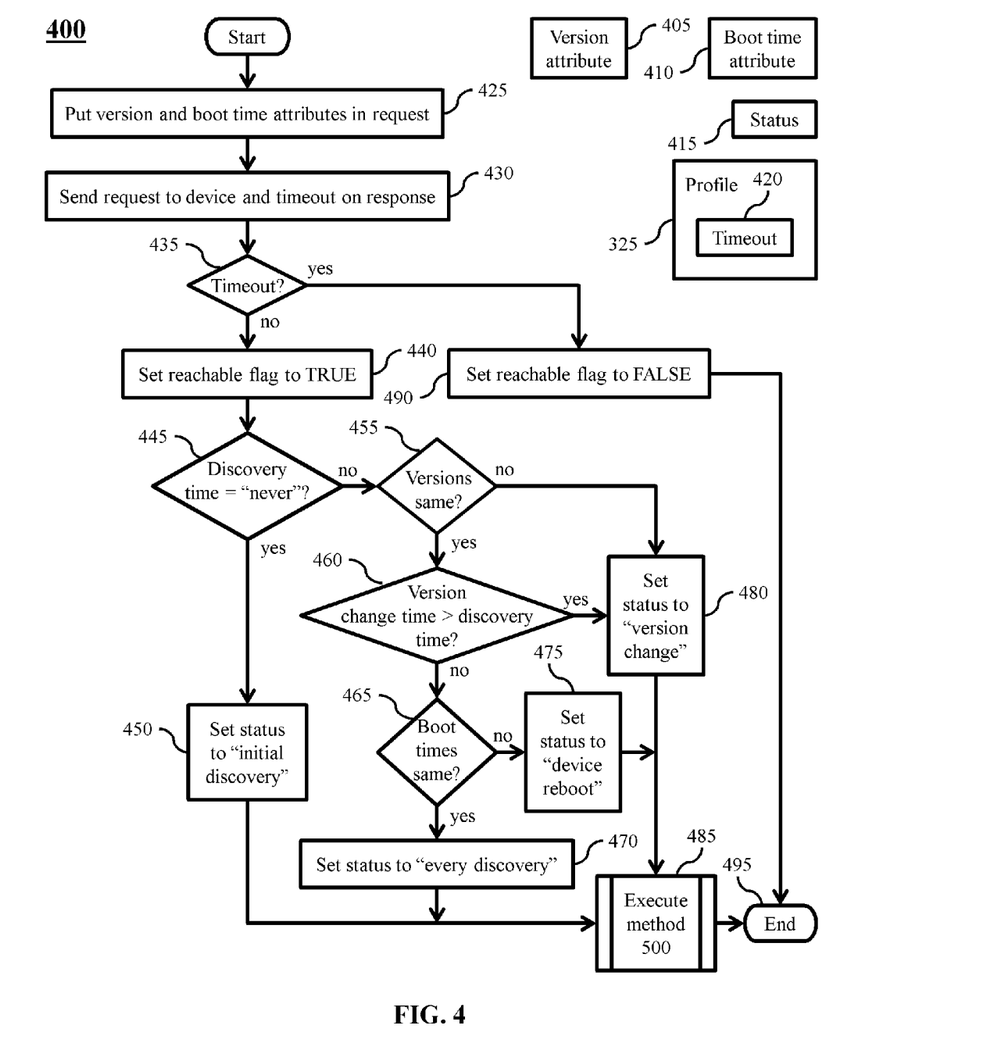
FIG. 4 is a flowchart of a method executed by an NMS to prepare for discovery of a network device by determining a status.

FIG. 4 is a flowchart of method 400 executed by NMS 105, in particular by processor 110, to prepare for discovery of network device 165 using profile 325, by determining a value of a status 415 to indicate which conditions in condition 212a through condition 212n and condition 237a through condition 237n are true. If processor 110 has never performed discovery on network device 165, then any such condition equal to "initial discovery" is true. If version 255 is not equal to version 285, or if version 255 is equal to version 285 but version 255 has changed since the last discovery of network device 165, then any such condition equal to "version change" is true. If boot time 252 is not equal to boot time 282, then any such condition equal to "device reboot" is true. Any such condition equal to "every discovery" is always true.

Profile 325, in addition to the elements shown in FIG. 3, comprises a timeout 420. Timeout 420 is a length of time that processor 110 will wait after sending request 155 to network device 165 for response 160 to arrive; in an alternate embodiment, processor 110 sends request 155 to network device 165 up to a specified number of times (i.e., retries), waiting for timeout 420 to expire each time, until response 160 arrives or the last retry times out. Method 400 begins with step 425.

In step 425, processor 110 sets request 155 to a version attribute 405 and a boot time attribute 410. In order to determine a value of status 415, processor 110 sends a preliminary instance of request 155 to network device 165 to get values for version 285 and boot time 282. From step 425, method 400 proceeds to step 430.

In step 430, processor 110 sends request 155 to network device 165 and waits until timeout 420 expires for response 160 to arrive, where response 160 comprises version 285 and boot time 282. From step 430, method 400 proceeds to step 435.

In step 435, if timeout 420 expired before response 160 arrived, then method 400 proceeds to step 490; otherwise, method 400 proceeds to step 440.

In step 440, processor 110 sets reachable flag 245 to TRUE, because network device 165 is reachable, i.e., response 160 arrived before timeout 420 expired. From step 440, method 400 proceeds to step 445.

In step 445, if discovery time 260 is equal to "never", thus indicating that NMS 105 has never yet discovered device 165, and as such, this is a first discovery of device 165, then method 400 proceeds to step 450; otherwise, method 400 proceeds to step 455.

In step 450, processor 110 sets status 415 to "initial discovery". From step 450, method 400 proceeds to step 485.

In step 455, if version 255 is equal to version 285, then method 400 proceeds to step 460; otherwise, method 400 proceeds to step 480.

In step 460, if version change time 262 is more recent than discovery time 270, then method 400 proceeds to step 480; otherwise, method 400 proceeds to step 465.

In step 465, if boot time 252 is equal to boot time 282, then method 400 proceeds to step 470; otherwise, method 400 proceeds to step 475.

In step 470, processor 110 sets status 415 to "every discovery". From step 470, method 400 proceeds to step 485.

In step 475, processor 110 sets status 415 to "device reboot". From step 475, method 400 proceeds to step 485.

In step 480, processor 110 sets a status 415 to "version change". From step 480, method 400 proceeds to step 485.

In step 485, processor 110 executes a method 500 in order to perform discovery on network device 165 using profile 325. From step 485, method 400 proceeds to step 495.

In step 490, processor 110 sets reachable flag 245 to FALSE. Step 490 is being executed because in step 435, timeout 420 expired before response 160 arrived. Setting reachable flag 245 to FALSE indicates that the present attempt to communicate with network device 165 was unsuccessful, and as such, network device 165 is presently deemed unreachable. From step 490, method 400 proceeds to step 495.

In step 495, method 400 ends.

Figure 5:
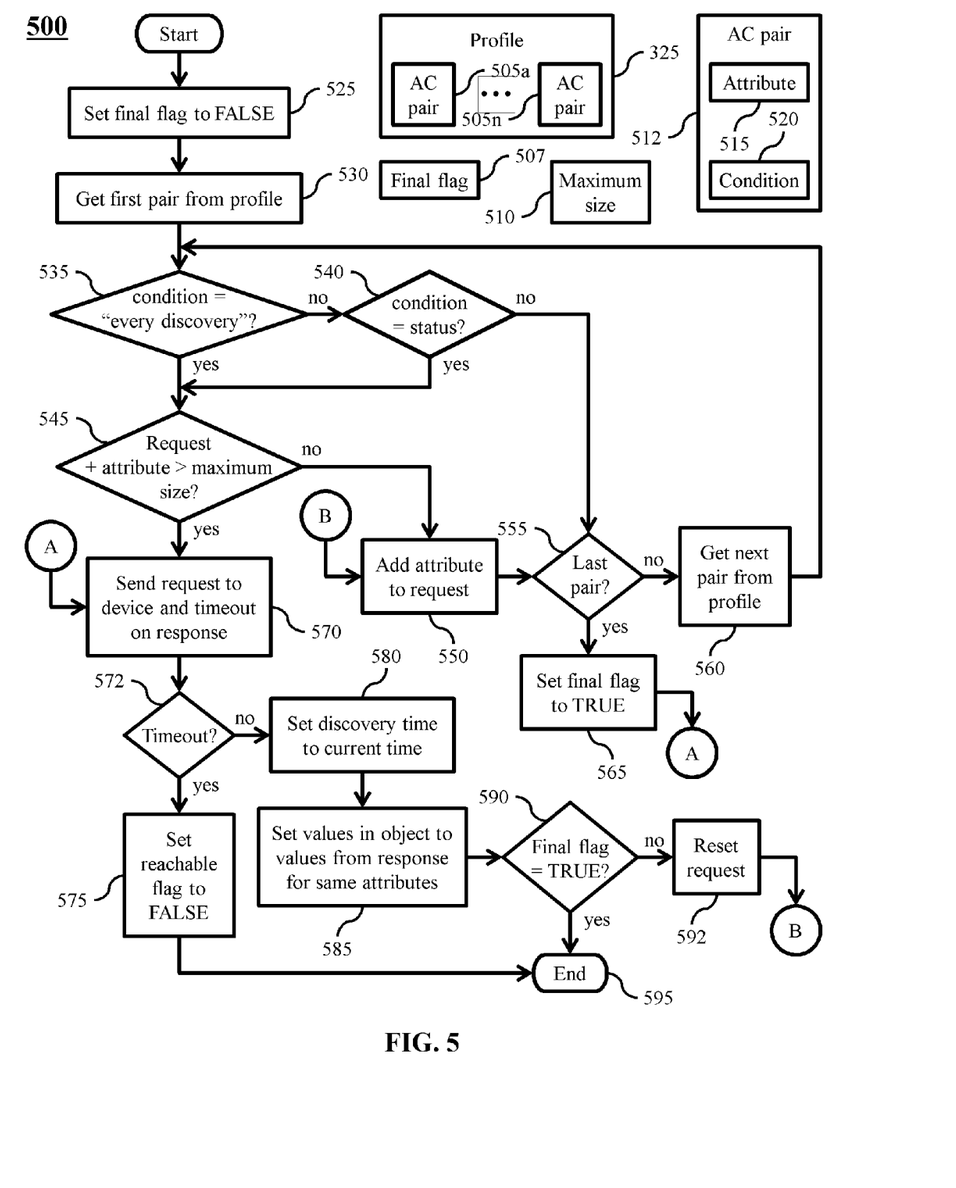
FIG. 5 is a flowchart of a method executed by an NMS to perform discovery on a network device using a profile.

FIG. 5 is a flowchart of method 500 executed by NMS 105, in particular by processor 110, to perform discovery on network device 165 using profile 325, by sending request 155 one or more times. Profile 325, in addition to the elements shown in FIGS. 3 and 4, comprises an AC pair 505a through an AC pair 505n. As mentioned above, profile 325 is a pointer to one of profile 220 or profile 222. As such, AC pair 505a through AC pair 505n are pointers to either AC pair 215a through AC pair 215n, respectively, or AC pair 240a through AC pair 240n, respectively. Method 500 begins with step 525.

In step 525, processor 110 sets a final flag 507 to FALSE, which indicates that the next time processor 110 sends request 155 to network device 165 will not be the last time. From step 525, method 500 proceeds to step 530.

In step 530, processor 110 starts processing each of AC pair 505a through AC pair 505n by setting an AC pair 512 to the first AC pair in profile 325, i.e., AC pair 505a, where AC pair 512 comprises an attribute 515 and a condition 520. AC pair 512 thus points to one of AC pair 215a or AC pair 240a, and as such attribute 515 points to one of attribute 210a or attribute 235a, and condition 520 points to one of condition 212a or condition 237a. Thus, processor 110 is effectively selecting one of AC pair 215a or AC pair 240a.

At this point, attribute 515 is regarded as a selected attribute, and condition 520 is regarded as a selected condition.

If condition 520 is TRUE, then attribute 515 should be included in request 115. As mentioned above, sample values for each of condition 212a through condition 212n and condition 237a through condition 237n include "initial discovery", "version change", "device reboot", and "every discovery". Accordingly, condition 520 may be a situation selected from the group consisting of (a) present discovery is an initial discovery of network device 165, (b) a version of network device 165 has changed, (c) network device 165 has rebooted, and (d) every discovery.

From step 530, method 500 proceeds to step 535.

In step 535, if condition 520 is equal to "every discovery", which means that attribute 515 should be included in every discovery, then method 500 proceeds to step 545; otherwise, method 500 proceeds to step 540.

In step 540, processor 110 determines whether condition 520 is equal to status 415. As mentioned above, status 415 can take on values such as "initial discovery", "device reboot", or "version change". Accordingly, if condition 520 is equal to status 415, which means that method 400 has determined that attribute 515 should be included in this discovery, then method 500 proceeds to step 545; otherwise, method 500 proceeds to step 555.

In step 545, if the size of request 155 plus the size of attribute 515 is greater than a maximum size 510, then method 500 proceeds to step 570; otherwise, method 500 proceeds to step 550.

In step 550, processor 110 adds attribute 515 to request 155, so that a value for attribute 515 will be discovered from network device 165. From step 550, method 500 proceeds to step 555.

In step 555, if AC pair 512 is the last AC pair in profile 325, i.e., AC pair 505n, then method 500 proceeds to step 565; otherwise, method 500 proceeds to step 560.

In step 560, processor 110 sets AC pair 512 to the next AC pair in profile 325. Thus, processor 110 effectively selects the next AC pair in one of profile 220 or profile 222. From step 560, method 500 loops back to step 535.

In step 565, processor 110 sets final flag 507 to TRUE, which indicates that the next time processor 110 sends request 155 to network device 165 will be the last time. From step 565, method 500 proceeds through connector A to step 570.

In step 570, processor 110 sends request 155 to network device 165 and waits until timeout 420 expires for response 160 to arrive. From step 570, method 500 proceeds to step 572.

In step 572, if timeout 420 expired before response 160 arrived, then method 500 proceeds to step 575; otherwise method 500 proceeds to step 580.

In step 575, processor 110 sets reachable flag 245 to FALSE. From step 575, method 500 proceeds to step 595.

In step 580, processor 110 sets discovery time 260 to current time 125. From step 580, method 500 proceeds to step 585.

In step 585, processor 110 updates object 242 with the results of discovery by setting each of a subset of value 275a through value 275n to a subset of value 292a through value 292n, respectively, as obtained from response 160. From step 585, method 500 proceeds to step 590.

In step 590, if final flag 507 is TRUE, which means that processor 110 just sent request 155 for the last time, then method 500 proceeds to step 595; otherwise, method 500 proceeds to step 592.

In step 592, processor 110 resets request 155, i.e., empties request 155 of attributes, so that processor 110 can put more attributes in request 155. From step 592, method 500 proceeds through connector B to step 550.

In step 595, method 500 ends.

System 100 is thus a system for reducing traffic on data network 150. System 100 includes processor 110 and memory 115, which contains instructions for controlling processor 110 to perform the methods described herein.

In a first embodiment of system 100, the instructions control processor 110 to perform operations of:
  reading reachable flag 245, which indicates whether a last attempted communication with network device 165 was successful;
  performing discovery of network device 165 at each time specified by schedule 225 in response to reachable flag 245 indicating that the last attempted communication with said network device 165 was successful, and at each time specified by schedule 202 in response to reachable flag 245 indicating that the last attempted communication with network device 165 was not successful,
  wherein the performing comprises:
  selecting:
    (A) attribute 235a as attribute 515, and condition 237a as condition 520, in response to reachable flag 245 indicating that the last attempted communication with network device 165 was successful, and
    (B) attribute 210a as attribute 515, and condition 212a as condition 520, in response to reachable flag 245 indicating that the last attempted communication with network device 165 was not successful,
    wherein condition 520, when TRUE, indicates that attribute 515 should be included in request 155 to network device 165;
  determining that condition 520 is TRUE;
  adding attribute 515 to request 155 in response to determining that condition 520 is TRUE; and
  sending request 155 to network device 165.

Also in the first embodiment, attribute 235a and condition 237a are an attribute-condition pair 240a in a plurality of attribute-condition pairs 240a-240n. The selecting and the determining are performed for each of the plurality of attribute-condition pairs 240a-240n. The sending comprises including in request 155 each attribute 235a-235n in the plurality of attribute-condition pairs 240a-240n that is paired with a condition 237a-237n in the plurality of attribute-condition pairs 240a-240n that is TRUE.

Also in the first embodiment, attribute 210a and condition 212a are an attribute-condition pair 215a in a plurality of attribute-condition pairs 215a-215n. The selecting and the determining are performed for each of the plurality of attribute-condition pairs 215a-215n. The sending comprises including in request each attribute 210a-210n in the plurality of attribute-condition pairs 215a-215n that is paired with a condition 212a-212n in said plurality of attribute-condition pairs 215a-215n that is TRUE.

In a second embodiment of system 100, the instructions control processor 110 to perform operations of:
  performing discovery of network device 165, wherein the performing comprises:
  determining that condition 520 is TRUE, wherein condition 520, when TRUE, indicates that attribute 515 should be included in request 155 to be sent to network device 165;
  adding attribute 515 to request 155 in response to determining that condition 520 is TRUE; and
  sending request 155 to network device 165.

Also in the second embodiment, prior to the performing, the instructions control processor 110 to perform an operation of reading reachable flag 245, and the performing further comprises, prior to the determining:
  selecting:
    (A) attribute 235a as attribute 515, and condition 237a as condition 520, in response to reachable flag 245 indicating that the last attempted communication with network device 165 was successful, and
    (B) attribute 210a as attribute 515, and condition 212a as condition 520, in response to reachable flag 245 indicating that the last attempted communication with network device 165 was not successful.

In a third embodiment of system 100, the instructions also control processor 110 to perform operations of:
  performing discovery of network device 165 in accordance with a schedule 225, in response to reachable flag 245 indicating that a last attempted communication with network device 165 was successful,
  wherein the performing comprises:
  selecting attribute 235a as attribute 515, and condition 237a as condition 520, wherein condition 520, when TRUE, indicates that attribute 515 should be included in request 155 to network device 165;
  determining that condition 520 is TRUE;
  adding attribute 515 to request 155 in response to determining that condition 520 is TRUE; and
  sending 570 request 155 to network device 165.

Also in the third embodiment, attribute 235a and condition 237a are an attribute-condition pair 240a in a plurality of attribute-condition pairs 240a-240. The selecting and the determining are performed for each of the plurality of attribute condition pairs 240a-240n. The sending comprises including in request 155 each attribute 235a-235n in the plurality of attribute-condition pairs 240a-240n that is paired with a condition 237a-237n in the plurality of attribute-condition pairs 240a-240n that is TRUE.

Also in the third embodiment, the performing is performed in accordance with schedule 202, in response to reachable flag 245 indicating that the last attempted communication with network device 165 was not successful. The selecting comprises selecting attribute 210a as attribute 515, and condition 212a as condition 520, in response to reachable flag 245 indicating that the last attempted communication with network device 165 was not successful.

Also in the third embodiment, attribute 210a and condition 212a are an attribute-condition pair 215a in a plurality of attribute-condition pairs 215a-215n. The selecting and the determining are performed for each of the plurality of attribute condition pairs 215a-215n) (560. The sending comprises including in request 155 each attribute 210a-210n in the plurality of attribute-condition pairs 215a-215n that is paired with a condition 212a-212n in the plurality of attribute-condition pairs 215a-215n that is TRUE.

In a fourth embodiment of system 100, the instructions control processor 110 to perform operations of:
  performing discovery of network device 165 in accordance with schedule 202, in response to reachable flag 245 indicating that a last attempted communication with network device 165 was not successful,
  wherein the performing comprises:
  selecting attribute 210a as attribute 515, and a condition 212a as condition 520, wherein condition 520, when TRUE, indicates that attribute 515 should be included in request 155 to network device 165;
  determining that condition 520 is TRUE;

adding attribute 515 to request 155 in response to determining that condition 520 is TRUE; and sending request 155 to network device 165.

Also in the fourth embodiment, attribute 210*a* and condition 212*a* are an attribute-condition pair 215*a* in a plurality of attribute-condition pairs 215*a*-215*n*. The selecting and the determining are performed for each of the plurality of attribute condition pairs 215*a*-215*n*. The sending comprises including in request 155 each attribute 210*a*-210*n* in the plurality of attribute-condition pairs 215*a*-215*n* that is paired with a condition 212*a*-212*n* in the plurality of attribute-condition pairs 215*a*-215*n* that is TRUE.

Also in the fourth embodiment, the performing is performed in accordance with schedule 225, in response to reachable flag 245 indicating that the last attempted communication with network device 165 was successful. The selecting comprises selecting attribute 235*a* as attribute 515, and condition 237*a* as condition 520, in response to reachable flag 245 indicating that the last attempted communication with network device 165 was successful.

Also in the fourth embodiment, attribute 235*a* and condition 237*a* are an attribute-condition pair 240*a* in a plurality of attribute-condition pairs 240*a*-240*n*. The selecting and the determining are performed for each of the plurality of attribute condition pairs 240*a*-240*n*). The sending comprises including in request 155 each attribute 235*a*-235*n* in the plurality of attribute-condition pairs 240*a*-240*n* that is paired with a condition 237*a*-237*n* in the plurality of attribute-condition pairs 240*a*-240*n* that is TRUE.

Although system 100 is described herein as including a single network device, i.e., network device 165, it can be configured with a plurality of such network devices. Accordingly, database 145 would contain a plurality of objects, similar to object 242, that correspond to the plurality of network devices, and NMS 105, by employment of the methods described herein, would service the plurality of network devices. Similarly, although database 145 is described herein as including two profiles, i.e., profile 220 and profile 222, it can be configured with more than two of such profiles. Accordingly, NMS 105, by employment of the methods described herein, would use the profiles to service the plurality of network devices.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof. The terms "a" and "an" are indefinite articles, and as such, do not preclude embodiments having pluralities of articles.

What is claimed is:

1. A method implemented in a network management system for reducing traffic on a data network, comprising:

reading, by the network management system, an indicator of whether a last attempted communication with a network device was successful;

performing, by the network management system, discovery of said network device by sending a request to said network device at each time specified by a first recurring schedule in response to said indicator indicating that said last attempted communication with said network device was successful, and at each time specified by a second recurring schedule in response to said indicator indicating that said last attempted communication with said network device was not successful, wherein said first recurring schedule has a different frequency for sending the request when compared to said second recurring schedule, wherein said request that is sent per the second recurring schedule has more conditions and is larger in size than said request that is sent per the first recurring schedule, wherein said performing comprises:

selecting:

(A) a first attribute as a selected attribute, and a first condition as a selected condition, in response to said indicator indicating that said last attempted communication with said network device was successful, and (B) a second attribute as said selected attribute, and a second condition as said selected condition, in response to said indicator indicating that said last attempted communication with said network device was not successful, wherein said selected condition, when TRUE, indicates that said selected attribute should be included in the request to said network device;

determining, by the network management system, that said selected condition is TRUE; and, adding, by the network management system, said selected attribute to said request in response to said determining that said selected condition is TRUE.

2. The method of claim 1, wherein said first attribute and said first condition are an attribute-condition pair in a plurality of attribute-condition pairs, wherein said selecting and said determining are performed for each of said plurality of attribute-condition pairs, and wherein said sending comprises including in said request each attribute in said plurality of attribute-condition pairs that is paired with a condition in said plurality of attribute-condition pairs that is TRUE.

3. The method of claim 1, wherein said second attribute and said second condition are an attribute-condition pair in a plurality of attribute-condition pairs, wherein said selecting and said determining are performed for each of said plurality of attribute-condition pairs, and wherein said sending comprises including in said request each attribute in said plurality of attribute-condition pairs that is paired with a condition in said plurality of attribute-condition pairs that is TRUE.

4. The method of claim 1, wherein said selected condition is a situation selected from the group consisting of:

(a) present discovery is an initial discovery of said network device;

(b) a version of said network device has changed;

(c) said network device has rebooted; and (d) every discovery.

5. A network management system for reducing traffic on a data network, the network management system comprising:

a processor; and a memory that contains instructions that control said processor to perform operations of:

reading an indicator of whether a last attempted communication with a network device was successful;
performing discovery of said network device by sending a request to said network device at each time specified by a first recurring schedule in response to said indicator indicating that said last attempted communication with said network device was successful, and at each time specified by a second recurring schedule in response to said indicator indicating that said last attempted communication with said network device was not successful, wherein said first recurring schedule has a different frequency for sending the request when compared to said second recurring schedule, wherein said request that is sent per the second recurring schedule has more conditions and is larger in size than said request that is sent per the first recurring schedule,
wherein said perform operation comprises:
select:
(A) a first attribute as a selected attribute, and a first condition as a selected condition, in response to said indicator indicating that said last attempted communication with said network device was successful, and
(B) a second attribute as said selected attribute, and a second condition as said selected condition, in response to said indicator indicating that said last attempted communication with said network device was not successful, wherein said selected condition, when TRUE, indicates that said selected attribute should be included in the request to said network device;
determining that said selected condition is TRUE; and
adding said selected attribute to said request in response to said determining that said selected condition is TRUE.

6. The network management system of claim 5,
wherein said first attribute and said first condition are an attribute-condition pair in a plurality of attribute-condition pairs,
wherein said selecting and said determining are performed for each of said plurality of attribute-condition pairs, and
wherein said sending comprises including in said request each attribute in said plurality of attribute-condition pairs that is paired with a condition in said plurality of attribute-condition pairs that is TRUE.

7. The network management system of claim 5,
wherein said second attribute and said second condition are an attribute-condition pair in a plurality of attribute-condition pairs,
wherein said selecting and said determining are performed for each of said plurality of attribute-condition pairs, and
wherein said sending comprises including in said request each attribute in said plurality of attribute-condition pairs that is paired with a condition in said plurality of attribute-condition pairs that is TRUE.

8. The network management system of claim 5, wherein said selected condition is a situation selected from the group consisting of:
(a) present discovery is an initial discovery of said network device;
(b) a version of said network device has changed;
(c) said network device has rebooted; and
(d) every discovery.

9. A storage device comprising instructions that are loaded into a network management system and read by a processor of the network management system to perform actions of:
reading an indicator of whether a last attempted communication with a network device was successful;
performing discovery of said network device by sending a request to said network device at each time specified by a first recurring schedule in response to said indicator indicating that said last attempted communication with said network device was successful, and at each time specified by a second recurring schedule in response to said indicator indicating that said last attempted communication with said network device was not successful, wherein said first recurring schedule has a different frequency for sending the request when compared to said second recurring schedule, wherein said request that is sent per the second recurring schedule has more conditions and is larger in size than said request that is sent per the first recurring schedule,
wherein said performing comprises:
selecting:
(A) a first attribute as a selected attribute, and a first condition as a selected condition, in response to said indicator indicating that said last attempted communication with said network device was successful, and
(B) a second attribute as said selected attribute, and a second condition as said selected condition, in response to said indicator indicating that said last attempted communication with said network device was not successful,
wherein said selected condition, when TRUE, indicates that said selected attribute should be included in the request to said network device;
determining that said selected condition is TRUE;
adding said selected attribute to said request in response to said determining that said selected condition is TRUE.

10. The storage device of claim 9,
wherein said first attribute and said first condition are an attribute-condition pair in a plurality of attribute-condition pairs,
wherein said selecting and said determining are performed for each of said plurality of attribute-condition pairs, and
wherein said sending comprises including in said request each attribute in said plurality of attribute-condition pairs that is paired with a condition in said plurality of attribute-condition pairs that is TRUE.

11. The storage device of claim 9,
wherein said second attribute and said second condition are an attribute-condition pair in a plurality of attribute-condition pairs,
wherein said selecting and said determining are performed for each of said plurality of attribute-condition pairs, and
wherein said sending comprises including in said request each attribute in said plurality of attribute-condition pairs that is paired with a condition in said plurality of attribute-condition pairs that is TRUE.

12. The storage device of claim 9, wherein said selected condition is a situation selected from the group consisting of:
(a) present discovery is an initial discovery of said network device;
(b) a version of said network device has changed;

(c) said network device has rebooted; and
(d) every discovery.

\* \* \* \* \*